US008233377B2

(12) United States Patent
Masaoka

(10) Patent No.: US 8,233,377 B2

(45) Date of Patent: Jul. 31, 2012

(54) ASSIGNMENT METHOD AND BASE STATION APPARATUS USING THE ASSIGNMENT METHOD

(75) Inventor: Nobuhiro Masaoka, Gifu (JP)

(73) Assignee: Kyocera Corporation, Kyoto (JP)

( * ) Notice: Subject to any disclaimer, the term of this patent is extended or adjusted under 35 U.S.C. 154(b) by 445 days.

(21) Appl. No.: 12/516,788

(22) PCT Filed: Nov. 22, 2007

(86) PCT No.: PCT/JP2007/001292

§ 371 (c)(1), (2), (4) Date: Jul. 28, 2009

(87) PCT Pub. No.: WO2008/068888

PCT Pub. Date: Jun. 12, 2008

(65) Prior Publication Data

US 2010/0067463 A1 Mar. 18, 2010

(30) Foreign Application Priority Data

Nov. 30, 2006 (JP) ................................ 2006-323512

(51) Int. Cl.

| | |
|---|---|
| ***H04J 11/00*** | (2006.01) |
| ***H04J 3/00*** | (2006.01) |
| ***H04W 4/00*** | (2009.01) |
| ***H04B 7/212*** | (2006.01) |
| ***H04K 1/10*** | (2006.01) |
| ***H04L 27/28*** | (2006.01) |

(52) U.S. Cl. ........ 370/208; 370/330; 370/337; 370/341; 370/347; 375/260

(58) Field of Classification Search ........................ None
See application file for complete search history.

(56) References Cited

U.S. PATENT DOCUMENTS

| | | | | |
|---|---|---|---|---|
| 5,579,306 A * | 11/1996 | Dent | ............................ | 370/330 |
| 2004/0114574 A1 * | 6/2004 | Zeira et al. | .................... | 370/352 |
| 2004/0166823 A1 * | 8/2004 | Alderton | .................... | 455/250.1 |
| 2005/0286547 A1 * | 12/2005 | Baum et al. | .................. | 370/437 |

(Continued)

FOREIGN PATENT DOCUMENTS

JP 08-289368 11/1996

(Continued)

OTHER PUBLICATIONS

Mahmoud et al, Initial Ranging for WiMAX (802.16e) OFDMA, Oct. 23-25, 2006, IEEE.*

(Continued)

*Primary Examiner* — Andrew Chriss

(74) *Attorney, Agent, or Firm* — Morrison & Foerster LLP

(57) ABSTRACT

A base station apparatus assigns a time slot, where multiple sub-channels have been frequency multiplexed, to a terminal apparatus. The correspondence between the range of signal strength and time slots is defined such that the time slot differs whenever the range of signal strength differs; a control unit assigns any one of a plurality of sub-channels in the time slot corresponding to the range of low signal strengths, to the terminal apparatus as a ranging channel. An RF unit, a modem unit and so forth perform a ranging operation on the terminal apparatus over the ranging channel assigned. The control unit assigns a sub-channel to the terminal apparatus that has performed the ranging operation, as a communication channel.

6 Claims, 11 Drawing Sheets

U.S. PATENT DOCUMENTS

2007/0248045 A1* 10/2007 Nagaraj ........................ 370/329

FOREIGN PATENT DOCUMENTS

| | | |
|---|---|---|
| JP | 2004-208234 | 7/2004 |
| JP | 2005-502218 | 1/2005 |
| JP | 2006-504338 | 2/2006 |
| JP | 2006-217415 | 8/2006 |
| JP | 2006-287462 | 10/2006 |
| WO | WO-02/49305 | 6/2002 |
| WO | WO-2004/038951 | 5/2004 |
| WO | WO-2006/043588 | 4/2006 |

OTHER PUBLICATIONS

Office Action from Japanese Patent Application No. 2006-323512, mailed on May 24, 2011.

International Preliminary Report on Patentability for PCT/JP2007/001292, mailed on Jun. 11, 2009, 11 pages.

International Search Report for PCT/JP2007/001292, mailed on Jan. 8, 2008, 5 pages.

* cited by examiner

| TIME SLOT NO. | RANGE OF SIGNAL STRENGTH |
| --- | --- |
| 1 | $P_A \leqq P < P_B$ |
| 2 | $P_B \leqq P < P_C$ |
| 3 | $P_C \leqq P < P_D$ |
| 4 | $P_D \leqq P$ |

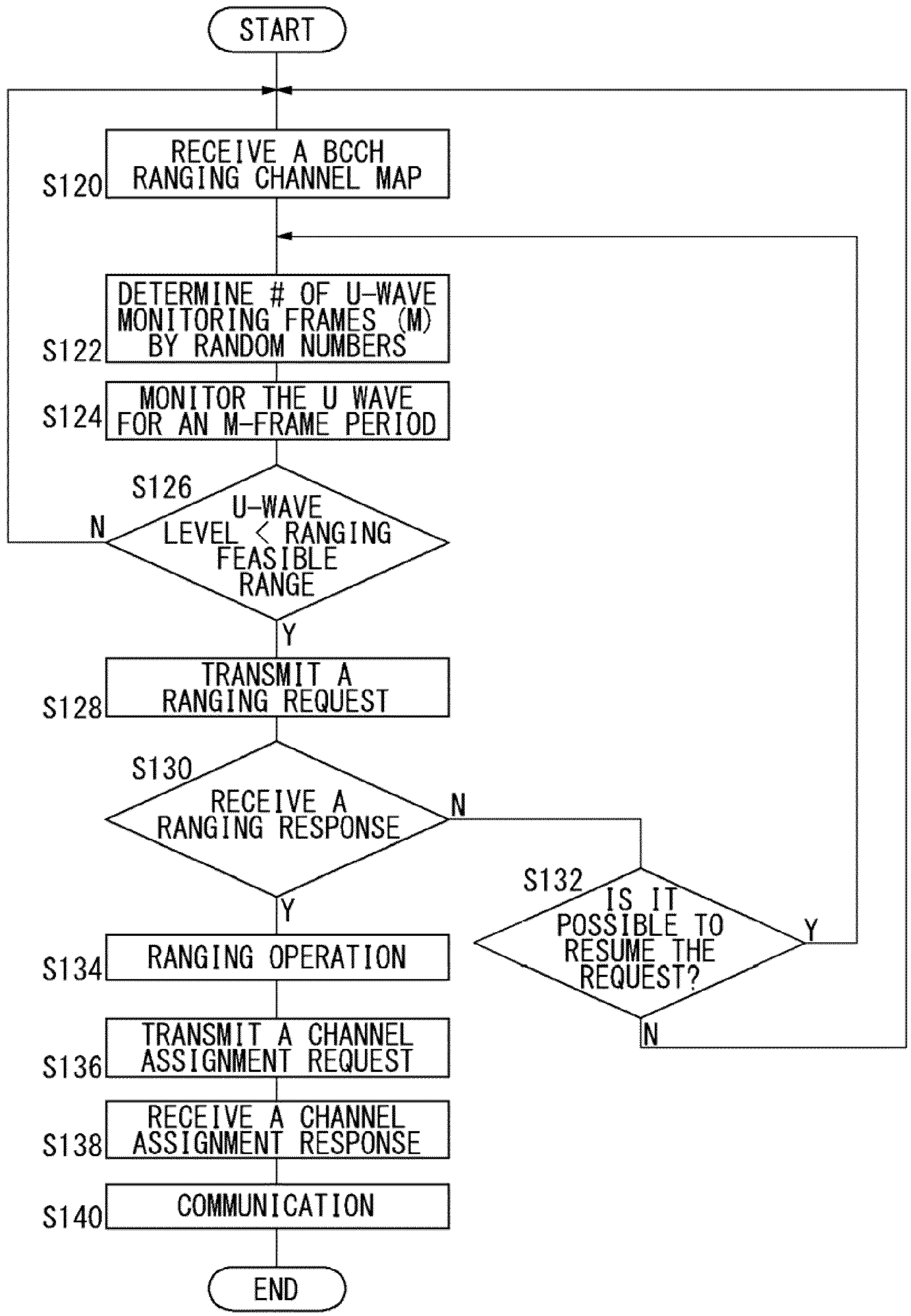
FIG.10
START
RECEIVE A BCCH RANGING CHANNEL MAP
S120
DETERMINE # OF U-WAVE MONITORING FRAMES (M) BY RANDOM NUMBERS
S122
MONITOR THE U WAVE FOR AN M-FRAME PERIOD
S124
S126
U-WAVE LEVEL < RANGING FEASIBLE RANGE
N
Y
TRANSMIT A RANGING REQUEST
S128
S130
RECEIVE A RANGING RESPONSE
N
Y
S132
IS IT POSSIBLE TO RESUME THE REQUEST?
Y
N
RANGING OPERATION
S134
TRANSMIT A CHANNEL ASSIGNMENT REQUEST
S136
RECEIVE A CHANNEL ASSIGNMENT RESPONSE
S138
COMMUNICATION
S140
END

ASSIGNMENT METHOD AND BASE STATION APPARATUS USING THE ASSIGNMENT METHOD

CROSS REFERENCE TO RELATED APPLICATIONS

This application is a U.S. National Phase Application of International Patent Application No. PCT/JP2007/001292 filed Nov. 22, 2007 which claims priority to Japanese Patent Application No. 2006-323512 filed Nov. 30, 2006, the disclosures of which are incorporated herein in their entirety.

TECHNICAL FIELD

The present invention relates to an assignment technique, and it particularly relates to a method for assigning channels to terminal apparatuses, and a base station using the assignment method.

BACKGROUND TECHNOLOGY

In wireless communications, it is generally desired that the limited frequency resources be used effectively. With a growing communication rate in particular, such a demand is ever increasing. One of technologies that meet this request is a technique called OFDMA (Orthogonal Frequency Division Multiple Access). OFDMA is a technique where a plurality of terminal apparatuses are frequency-multiplexed using OFDM. Such an OFDMA technique requires scheduling processing for allocating subcarriers to a plurality of terminal apparatuses. In the conventional practice, a subcarrier whose signal-to-noise ratio is high in a plurality of subcarriers is allocated to the terminal apparatuses (see Patent Document 1, for instance).

[Patent Document 1] Japanese Patent Application Laid-Open No. 2005-502218.

DISCLOSURE OF THE INVENTION

Problems to be Solved by the Invention

In the OFDMA, processings such as FFT (Fast Fourier Transform) processing, AGC (Automatic Gain Control) processing and the like are performed, at one time and all together, on a plurality of subcarriers, at a receiving side. In a case where the received power of any one of terminal apparatuses is extremely lower than that of the other terminal apparatuses in performing such processings, the gain is adjusted based on a higher received power as a reference at the time of the AGC processing. Thus the receiving characteristics deteriorate because the signal at the terminal of a lower received power cannot achieve a sufficient gain. Also, since OFDMA requires orthogonality the same way as with OFDM, the receiving characteristics deteriorate due to the frequency offset between the terminal apparatuses. In order to suppress such deterioration of the receiving characteristics, the power and frequency offset are adjusted in OFDMA prior to the start of a communication. Such adjustment as this is called a ranging operation. The ranging operation is performed over a ranging channel. It is desired that the accuracy of the ranging operation be higher for the improvement of communication characteristics.

The present invention has been made in view of such circumstances and a purpose thereof is to provide an assignment technique by which to raise the accuracy of the ranging operation.

Means for Solving the Problems

In order to resolve the above problems, a base station apparatus according to one embodiment of the present invention assigns a time slot, where a plurality of sub-channels have been frequency multiplexed, to a terminal apparatus. This base station comprises: a first assignment unit which assigns any of a plurality of sub-channels in the time slot corresponding to the range of low signal strengths, to the terminal apparatus as a ranging channel wherein a correspondence between the range of signal strength and time slots is defined in such a manner that the time slot differs whenever the range of signal strength differs; an execution unit which performs a ranging operation on the terminal apparatus over the ranging channel assigned by the first assignment unit; and a second assignment unit which assigns a sub-channel to the terminal apparatus that has performed the ranging operation in the execution unit, as a communication channel.

According to this embodiment, any of a plurality of sub-channels in the time slot associated with the range of low signal strengths is assigned as a ranging channel. Thus the effect of interference can be reduced and the accuracy of the ranging operation can be enhanced.

The first assignment unit may set sub-channels at least adjacent to a sub-channel to which the ranging channel has been assigned, to a nonuse state. In such a case, the sub-channels adjacent thereto is not used, so that the accuracy of the ranging operation can be enhanced.

After the ranging operation has been terminated, the first assignment unit may use the ranging channel assigned to the terminal apparatus, for communication of control signal. In such a case, a transition is made from the ranging operation to the communication of control signal over the ranging channel, so that the processing can transit smoothly to the next step.

The base station apparatus may further comprise a broadcasting unit which broadcasts information on a ranging channel to be assigned by the first assignment unit. In such a case, the information on a ranging channel to be assigned is broadcast, so that the terminal apparatus is informed of the presence of the ranging channel.

Another embodiment of the present invention relates to a method for assigning a time slot, where a plurality of sub-channels have been frequency multiplexed, to a terminal apparatus. This method is characterized by the features that a correspondence between the range of signal strength and time slots is defined in such a manner that the time slot differs whenever the range of signal strength differs, any of a plurality of sub-channels in the time slot corresponding to the range of low signal strengths is assigned to the terminal apparatus as a ranging channel, and after a ranging operation in the ranging channel has been terminated, a sub-channel is assigned to the terminal apparatus as a communication channel.

Sub-channels at least adjacent to a sub-channel to which the ranging channel has been assigned may be set to a nonuse state. After the ranging operation has been terminated, the ranging channel assigned to the terminal apparatus may be used for communication of control signal. Information on a ranging channel to be assigned may be broadcast.

Still another embodiment of the present invention relates to a program, executable by a computer, for assigning a time slot, where a plurality of sub-channels have been frequency multiplexed, to a terminal apparatus. This program includes the functions of: assigning any of a plurality of sub-channels in the time slot corresponding to the range of low signal strengths, to the terminal apparatus as a ranging channel wherein a correspondence between the range of signal strength and time slots is defined in such a manner that the time slot differs whenever the range of signal strength differs; performing a ranging operation on the terminal apparatus over the assigned ranging channel; and assigning a sub-channel to the terminal apparatus that has performed the ranging operation, as a communication channel.

The step of assigning a sub-channel to the terminal apparatus as a communication channel may be such that sub-channels at least adjacent to a sub-channel to which the ranging channel has been assigned may be set to a nonuse state. The method may further include using the ranging channel assigned to the terminal apparatus for communication of control signal, after the ranging operation has been terminated. The method may further include broadcasting information on the ranging channel to be assigned in the assigning any of a plurality of sub-channels in the time slot corresponding to the range of low signal strengths to the terminal apparatus as a ranging channel.

Optional combinations of the aforementioned constituting elements, and implementations of the invention in the form of methods, apparatuses, systems, recording mediums, computer programs and so forth may also be effective as additional modes of the present invention.

Advantage of the Invention

The present invention enhances the accuracy of a ranging operation.

BRIEF DESCRIPTION OF THE DRAWINGS

FIG. 10 is a flowchart showing a procedure for performing a ranging operation by a terminal apparatus of FIG. 1.

DESCRIPTION OF THE REFERENCE NUMERALS

10 Base station apparatus, 12 Terminal apparatus, 20 RF unit, 22 Modem unit, 24 Baseband processing unit, 26 IF unit, 28 Measurement unit, 30 Control unit, 100 Communication system.

BEST MODE FOR CARRYING OUT THE INVENTION

An outline of the present invention will be given before a specific description thereof. Exemplary embodiments of the present invention relate to a communication system comprised of a base station apparatus and at least one terminal apparatus. In the communication system, each frame is formed when a plurality of time slots are time-division multiplexed. And each time slot is formed when a plurality of sub-channels are frequency-division multiplexed. Each sub-channel is formed by a multicarrier signal. Here, OFDM signals are used as the multicarrier signals whereas OFDMA is used as the frequency-division multiplexing.

The base station apparatus assigns one sub-channel in at least one time slot to a terminal apparatus, namely, sets a communication channel so as to execute communication with this terminal apparatus. Prior to assigning the sub-channel to the terminal apparatus, the base station apparatus assigns a ranging channel to the terminal apparatus so as to perform a ranging operation between the base station apparatus and the terminal apparatus, namely, so as to adjust the frequency offset, timing and transmitting power. In the present exemplary embodiment, the following processing is performed to enhance the accuracy of ranging operation and reduce the effect on the other terminal apparatuses which are already executing communication processings.

The base station apparatus defines the range of strength of signals sent from the terminal apparatus and the time slot by associating with each other. Here, the range of signal strength and the time slot are associated with each other in such a manner that the time slot differs whenever the range of signal strength differs. The base station apparatus sets a ranging channel to a time slot (hereinafter referred to as "targeted time slot") which is defined so that the range of signal strength becomes small. In other words, one or more sub-channels of a plurality of sub-channels contained in a targeted time slot are set to the ranging channel. At least at an initial stage of a ranging operation, the base station and the terminal apparatus make the transmitting power smaller so that the transmitting power falls within the signal strength defined. Further, throughout a period of ranging operation, the base station apparatus sets sub-channels adjacent to a sub-channel channel to which the ranging channel has been set, to a nonuse state. That is, no ranging channel or communication channel is set to sub-channels adjacent to the sub-channel to which the ranging channel has already been set.

Figure 1:
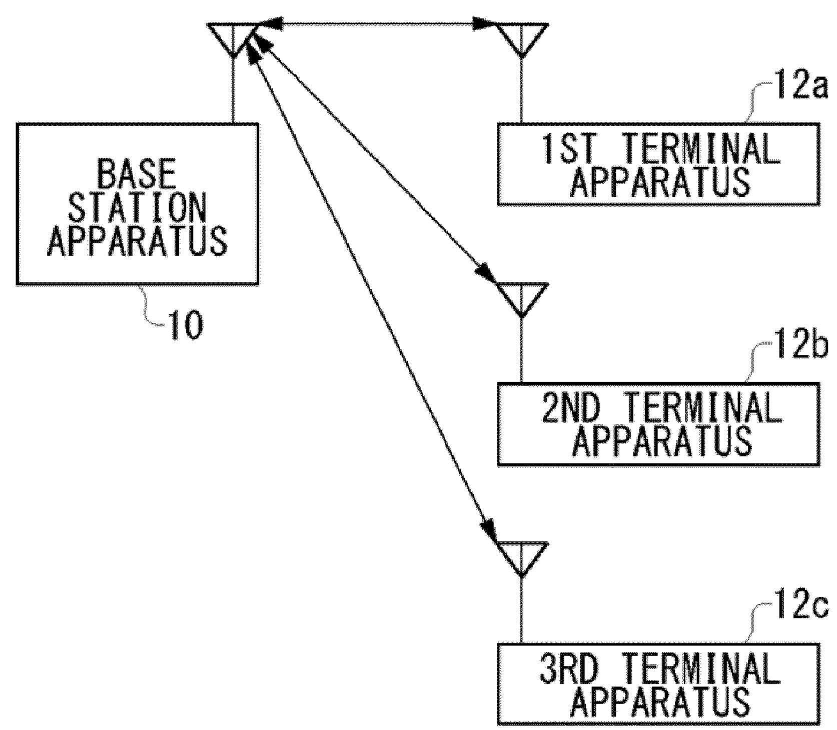
FIG. 1 shows a structure of a communication system according to an exemplary embodiment of the present invention.

FIG. 1 shows a structure of a communication system 100 according to an exemplary embodiment of the present invention. The communication system 100 includes a base station apparatus 10, and a first terminal apparatus 12*a*, a second terminal apparatus 12*b*, and a third terminal apparatus 12*c*, which are generically referred to as "terminal apparatus 12".

One end of the base station apparatus 10 connects to the terminal apparatus 12 via a radio network, whereas the other end thereof connects to a not-shown wired network. Also, the terminal apparatus 12 connects to the base station apparatus 10 via the radio network. The base station apparatus 10 performs wireless communication with a plurality of terminal apparatuses 12 by allocating communication channels thereto. More specifically, the terminal apparatus 12 transmits to the base station apparatus 10 a request signal requesting a channel allocation; in response to a received request signal, the base station apparatus 10 allocates a communication channel to the terminal apparatus 12.

Also, the base station apparatus 10 transmits information on the communication channel allocated to the terminal apparatus 12, and the terminal apparatus 12 executes communication with the base station apparatus 10 using the allocated communication channel. As a result, the data transmitted from the terminal apparatus 12 are outputted to the wired network via the base station apparatus 10 and are finally received by a not-shown communication apparatus connected to the wired network. The data are also transmitted toward the terminal apparatus 12 from the communication apparatus.

As described above, the base station apparatus 10 has a plurality of time slots and a plurality of sub-channels. Thus the base station apparatus 10 performs TDMA using a plurality of time slots and, at the same time, performs OFDMA using a plurality of sub-channels. In order to suppress the deterioration of receiving quality, the base station apparatus 10 performs a ranging operation on the terminal apparatus 12 prior to performing OFDMA. Any known technique may be used for the ranging operation. Thus, though its detail is omitted here, for example the terminal apparatus 12 transmits a known signal and the base station apparatus 10 derives correction values for the frequency offset, timing and signal strength, based on the received known signal. The base station apparatus 10 conveys the thus derived result to the terminal apparatus 12, and the terminal apparatus 12 reflects the conveyed contents thereof.

The aforementioned processing may be performed in the reverse direction. Though the ranging operation is performed over the ranging channels, the base station apparatus 10 sets a predetermined sub-channel to a ranging channel and assigns the ranging channel to a targeted terminal. The assignment of ranging channels will be discussed later.

Figure 2:
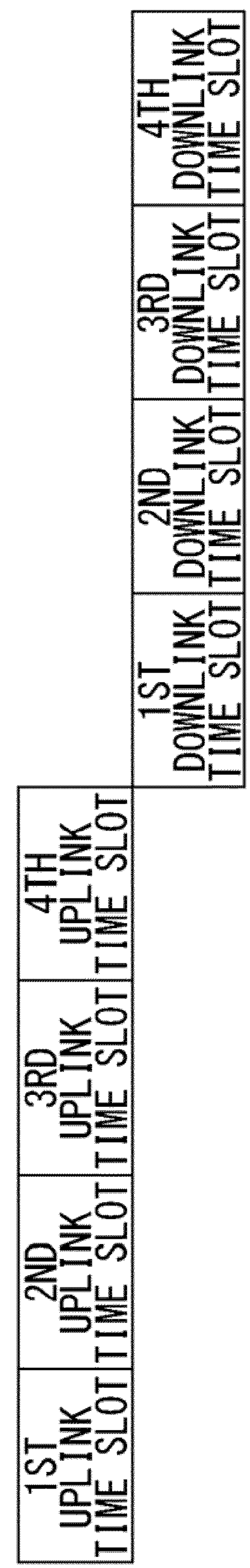
FIG. 2 shows a structure of a frame in the communication system of FIG. 1.

FIG. 2 shows a structure of a frame in the communication system 100. As shown in FIG. 2, a frame is constituted by eight time slots. The eight time slots are composed of four downlink time slots and four uplink time slots. Here, the four uplink time slots are denoted as a “first uplink time slot” to a “fourth uplink time slot”, whereas the four downlink time slots are denoted as a “first downlink time slot” to a “fourth downlink time slot”. The frame as shown in FIG. 2 is repeated contiguously. Note that the structure of a frame is not limited to that of FIG. 2. For the clarity of explanation, a description will be given hereinbelow of the structure of a frame assuming that the frame is constituted as shown in FIG. 2. For the simplicity of explanation, if a description is given of the uplink time slots only or the downlink time slots only, the same description will be valid for the other time slots.

The base station apparatus defines beforehand the correspondence between the range of signal strength and the time slots in such a manner that the time slot differs whenever the range of signal strength differs. For example, when the strength of a received signal is “greater than or equal to −50 dBm”, the “fourth uplink time slot” is used; when the signal strength is “less than −50 dBm and greater than or equal to −60 dBm”, the “third uplink time slot” is used; when the signal strength is “less than −60 dBm and greater than or equal to −70 dBm”, the “second uplink time slot” is used; and when the signal strength is “less than −70 dBm”, the “first uplink time slot” is used. Of the time slots corresponding to the range of low signal strengths, namely, of the aforementioned targeted time slots, the base station apparatus 10 sets any of a plurality of sub-channels to the ranging channel.

Figure 3:
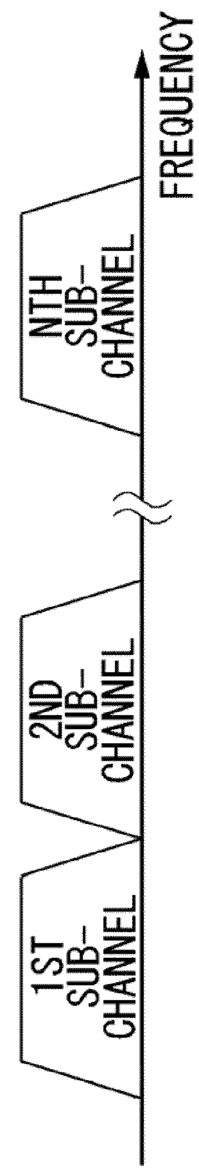
FIG. 3 shows an assignment of sub-channels in the communication system of FIG. 1.

FIG. 3 shows an assignment of sub-channels in the communication system 100. In FIG. 3, the horizontal axis represents the frequency axis and illustrates the spectrum for time slots shown in FIG. 2. As illustrated in FIG. 3, N sub-channels composed of the first sub-channel to the Nth sub-channel are frequency-division multiplexed in each time slot. Each sub-channel is constituted by multicarrier signals, namely, OFDM signals here. The first sub-channel to the Nth sub-channel are used as communication channel, control channel and broadcast channel. As described above, if a time slot is a targeted time slot, some of the sub-channels are used as the ranging channels.

Figure 4:
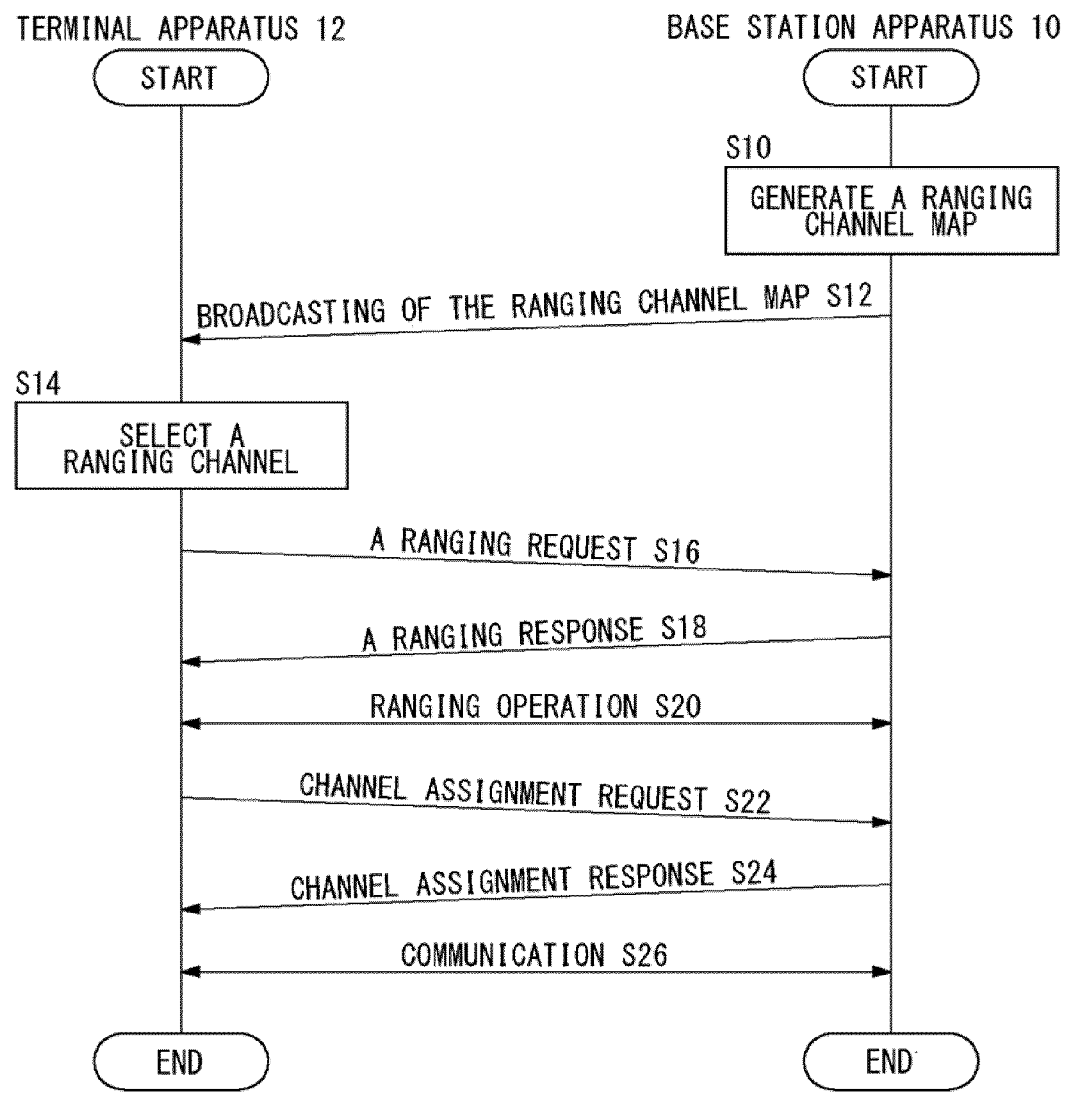
FIG. 4 shows a sequence of communication procedures by the communication system of FIG. 1.

An operation of the communication system 100 structured as above will now be described. FIG. 4 shows a sequence of communication procedures by the communication system 100. The base station apparatus 10 generates a ranging channel map (S10). The ranging channel map is a table that indicates sub-channels used for the ranging channel. The base station apparatus 10 broadcasts the ranging channel map by having the ranging channel map contained in the broadcast channel (S12). While using the received ranging channel map, the terminal apparatus 12 selects a ranging channel to be used for the ranging operation (S14). The terminal apparatus 12 transmits an allocation request to the selected ranging channel, as a ranging request (S16).

As the base station apparatus 10 allocates in response to the ranging request, the base station apparatus 10 transmits the result thereof as the ranging response (S18). The terminal apparatus 12 and the base station apparatus 10 perform a ranging operation using the allocated ranging channel (S20). After the completion of the ranging operation, the terminal apparatus 12 transmits a channel allocation request to the base station apparatus 10 (S22), and the base station apparatus 10 transmits a channel allocation response to the terminal apparatus 12 (S24). This sets a communication channel between the base station apparatus 10 and the terminal apparatus 12. The base station apparatus 10 and the terminal apparatus 12 communicate with each other using the communication channel.

Figure 5:
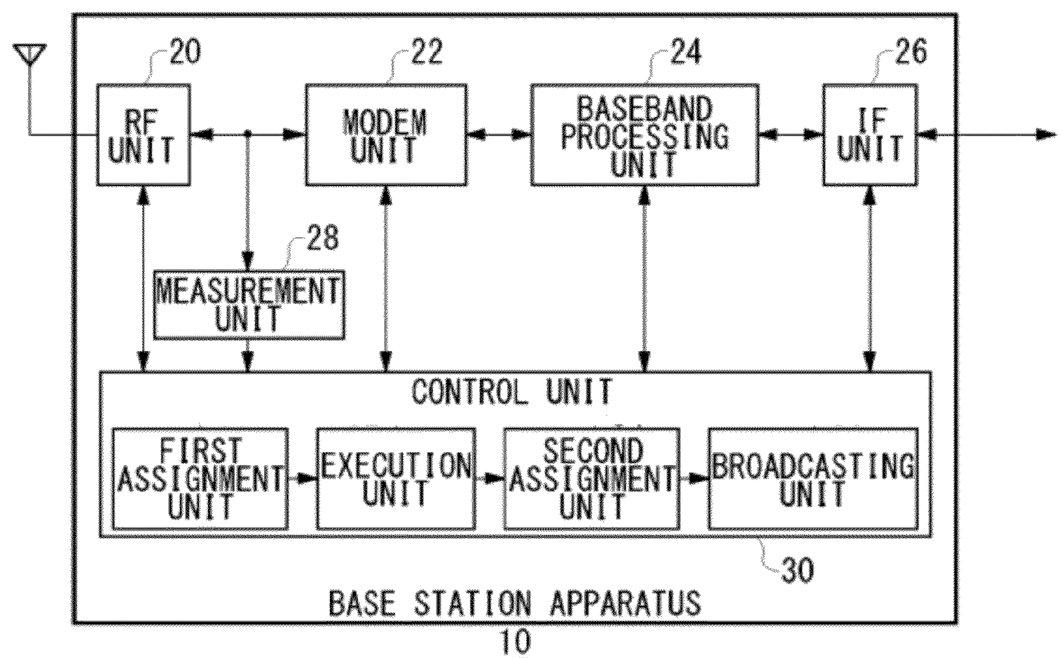
FIG. 5 shows a structure of a base station apparatus of FIG. 4.

FIG. 5 shows a structure of the base station apparatus 10. The base station apparatus 10 includes an RF unit 20, a modem unit 22, a baseband processing unit 24, an IF unit 26, a measurement unit 28, and a control unit 30.

As a receiving processing, the RF unit 20 performs frequency conversion on radiofrequency multicarrier signals received from a not-shown terminal apparatus 12 so as to produce baseband multicarrier signals. Here, the multicarrier signal is formed as shown in FIG. 3 and corresponds to an uplink time slot as shown in FIG. 2. Further, the RF unit 20 outputs the baseband multicarrier signal to the modem unit 22. The baseband multicarrier signal, which is composed of in-phase components and quadrature components, shall generally be transmitted by two signal lines. For the clarity of Figures, the baseband multicarrier signal is presented here by a single signal line only. An AGC unit and an A-D conversion unit are also included in the RF unit 20.

As a transmission processing, the RF unit 20 performs frequency conversion on the baseband multicarrier signals inputted from the modem unit 22 and thereby produces radiofrequency multicarrier signals. Further, the RF unit 20 transmits the radiofrequency multicarrier signals. The RF unit 20 transmits the multicarrier signals using the same radio-frequency band as that of the received multicarrier signals. That is, assume that TDD (Time Division Duplex) is in use as shown in FIG. 2. A PA (Power Amplifier) and a D-A conversion unit are also included in the RF unit 20.

As a receiving processing, the modem unit 22 converts a time domain into a frequency domain by performing FFT on the baseband multicarrier signals inputted from the RF unit 20. The multicarrier signals converted from the time domain into the frequency domain have components corresponding respectively to a plurality of subcarriers. The modem unit 22 sets timing synchronization, namely FFT window, and also removes the guard interval. A known technique may be used for the timing synchronization or the like and therefore the description thereof is omitted here. Also, the modem unit 22 demodulates the multicarrier signals which have been converted into the frequency domain. Though channel characteristics are estimated for the demodulation, the channel characteristics are estimated on a subcarrier-by-subcarrier basis. The modem unit 22 outputs the results of the demodulation to the baseband processing unit 24.

As a transmission processing, the modem unit 22 modulates the multicarrier signals received from the baseband processing unit 24. Also, the modem unit 22 converts a frequency domain into a time domain by performing IFFT on the modulated multicarrier signals. The modem unit 22 outputs the multicarrier signals which have been converted to the time domain, to the RF unit 20 as baseband multicarrier signals. Though the modem unit 22 also appends guard interval, the description thereof is omitted here.

As a receiving processing, the baseband processing unit 24 receives the results of the demodulation and separates the demodulation results for each of the terminal apparatuses 12. That is, the demodulation results are composed of a plurality of sub-channels as shown in FIG. 3. Accordingly, if each sub-channel is assigned to each terminal apparatus 12, the demodulation results will contain signals sent from a plurality of terminal apparatuses. The baseband processing unit 24 separates such demodulation results for each of the terminal apparatuses 12. The baseband processing unit 24 appends information used to identify an originating terminal apparatus 12 and information used to identify the destination thereof to the demodulation results, and outputs them to the IF unit 26.

As a transmission processing, the baseband processing unit 24 receives, from the IF unit 26, data to be sent to a plurality of terminal apparatuses 12, and then assigns the data to sub-channels so as to form multicarrier signals from a plurality of sub-channels. That is, the baseband processing unit 24 forms multicarrier signals composed of a plurality of sub-channels, as shown in FIG. 3. Note that a sub-channel to which data are to be assigned is determined beforehand and an instruction on this predetermined sub-channel is received from the control unit 30. The baseband processing unit 24 outputs the multicarrier signals to the modem unit 22.

As a receiving processing, the IF unit 26 outputs the demodulation results received from the baseband processing unit 24, to the not-shown wired network. The destination of the demodulation results, which is information appended to the demodulation results, is set based on information used to identify the destination. Here, the information used to identify the destination is indicated by IP (Internet Protocol) addresses, for instance. As a transmission processing, the IF unit 26 receives the input of data for a plurality of terminal apparatuses 12 via the not-shown wired network. The control unit 30 outputs the inputted data to the baseband processing unit 24.

The measurement unit 28 measures the strength of signals received by the RF unit 20. Here, the measurement unit 28 measures not only the signal strength of terminal apparatuses 12 to be communicated but also the strength of signals that may interfere therewith. The control unit 30 carries out the allocation of sub-channels, the control of a ranging operation, the timing control for the entirety of the base station apparatus 10, and so forth. Here, the operations up to the allocation of communication channels are divided into seven stages. The seven stages are (1) the setting of a time slot to which the ranging channel is to be assigned, (2) the generation of a U-wave table, (3) the generation of a ranging table, (4) the broadcasting of a ranging channel map, (5) the setting of a ranging channel, (6) a ranging operation, and (7) the setting of a communication channel. Of these seven stages, (1) to (5) correspond to the setting of a ranging channel. The seven stages will now be described hereunder in order.

(1) The Setting of a Time Slot to which the Ranging Channel is to be Assigned

As shown in FIG. 2, the control unit 30 selects at least one time slot from among a plurality of time slots contained in a frame, and assigns a ranging channel to the selected time slot. Here, the selected time slot corresponds to the aforementioned targeted time slot. Note that each time slot is associated with a range of signal strength, and the control unit 30 selects a time slot associated with the range of low signal strengths, as a control time slot.

Figure 6:
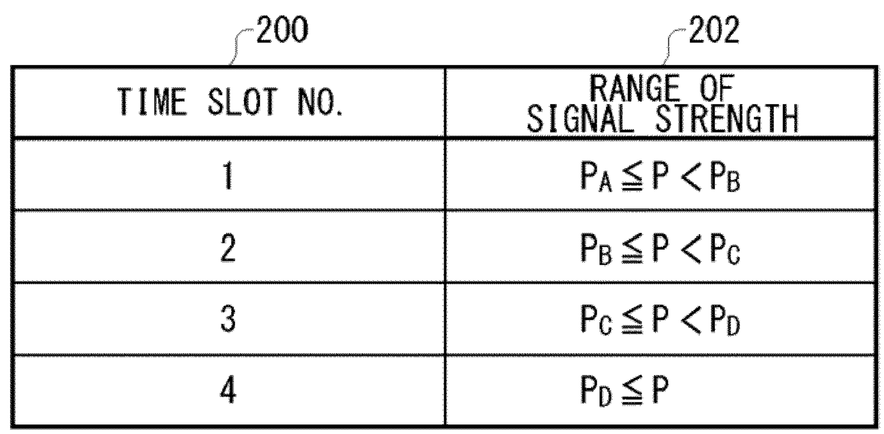
FIG. 6 is a data structure of a table showing a relationship, between time slots and the ranges of signal strength, stored in a control unit of FIG. 5.

FIG. 6 is a data structure of a table showing a relationship, between the time slots and the ranges of signal strength, stored in the control unit 30. As shown in FIG. 6, the table contains a time slot No. column 200 and a range-of-signal-strength column 202. In the range-of-signal-strength column 20, $P_A$, $P_B$, $P_C$, and $P_D$ are parameters that indicate the lower limit and/or the upper limit of the range of signal strength P. The relation in magnitude is $P_A<P_B<P_C<P_D$. A minimum signal strength with which the communication is feasible may be set to $P_A$. In the column 200, the time slots as shown in FIG. 2 are numbered as "1" to "4".

Using such a table as described above, the range of signal strength "$P_A \leqq P<P_B$" is associated with the first time slot. Note that the first time slot corresponds to the first uplink time slot or the first downlink time slot. Here, the range of signal strength corresponding to the first time slot is smaller than that corresponding to the other time slots, so that the targeted time slot corresponds to the first time slot.

(2) Generation of a U-Wave Table

The control unit 30 identifies the targeted time slot and then has the measurement unit 28 measure the signal strength of a plurality of sub-channels, respectively, contained in the targeted time slot. This signal strength corresponds to that of spurious waves or interference waves in a case when the ranging channel has been set. The control unit 30 stores the measured signal strengths in the form of a table by associating a plurality of sub-channels with the measured signal strengths. This table will be called a U-wave table.

(3) Generation of a Ranging Table

Referring to the U-wave table, the control unit 30 selects a sub-channel usable for a ranging channel, from within the targeted slot. The control unit 30 selects a sub-channel whose signal strength, namely, whose U-wave level is smaller than a threshold value and which is not used for the communication channel and the like. Also, the control unit 30 selects a sub-channel whose adjacent sub-channels are not used for the communication channel and the like. For example, when the second sub-channel to the fourth sub-channel are not used for the communication channel and the like and the U-wave level in the third sub-channel is smaller than a threshold value, the control unit 30 selects the second sub-channel as the ranging channel. Also, the control unit 30 sets at least the sub-channels adjacent to the sub-channel which has been used for the ranging channel, to a nonuse state. Further, the control unit 30 repeats the above-described processing for the other sub-channels, and stores the selected sub-channels in a table. This table will be called a ranging table.

(4) The Broadcasting of a Ranging Channel Map

The control unit 30 selects a predetermined number of sub-channels from the sub-channels contained in the ranging table, namely the ranging channels, and prepares a ranging channel map that lists the numbers of the thus selected sub-channels. Also, the control unit 30 broadcasts a broadcast channel, such as BCCH, containing the ranging channel map, via the modem unit 22, the RF unit 20 and so forth. In other words, the control unit 30 broadcast information on the ranging channels to be assigned, via the modem unit 22 and the RF unit 20.

(5) The Setting of a Ranging Channel

The control unit 30 receives, via the RF, the modem unit 22 and the like, a ranging request from the terminal apparatus 12 that has received the broadcast channel containing the ranging channel map. The ranging request is a notification that requests the execution of a ranging operation. The ranging request contains the information on a ranging channel selected, by the terminal apparatus 12, from among the ranging channels contained in the ranging channel map. For example, the second sub-channel is selected. The control unit 30 assigns this ranging channel to the terminal apparatus 12, if this range channel can be assigned at all, and then transmits a report on the fact that this ranging channel has been assigned thereto, to the terminal apparatus 12 as a ranging response via the modem unit 22 and the RF unit 20. As a result, the base station apparatus 10 and the terminal apparatus 12 recognize a common sub-channel as the ranging channel. Through the above processing, the control unit 30 assigns any of a plurality of sub-channels in a time slot associated with the range of lower strengths, to the terminal apparatus 12 as the ranging channel.

(6) Ranging Operation

After the ranging channel has been assigned, the base station apparatus 10 and the terminal apparatus 12 perform a ranging operation. Particularly, the control unit 30 has the RF unit 20 and the modem unit 22 perform a ranging operation with the terminal apparatus 12 over the assigned ranging channel. One example of the ranging operation may be one described above and a conventional technique may be used to perform the ranging operation, so that the description thereof is omitted. Through the ranging operation, the base station apparatus 10 and the terminal apparatus 12 adjust the frequency offset, timing and signal strength between each other. For example, the terminal apparatus 12 adjusts the transmitting power so that the transmitting power falls within the range of signal strengths corresponding to the first uplink time slot as shown in FIG. 2 and FIG. 6, namely, the range of minimum signal strength.

(7) The Setting of a Communication Channel

As the control unit 30 receives, via the RF unit, the modem unit 22 and the like, a channel assignment request from a terminal apparatus 12 that has performed a ranging operation, the control unit 30 assigns a communication channel to this terminal apparatus 12. As discussed earlier, the transmitting power of the terminal apparatus 12 is so adjusted that the transmitting power thereof falls within the range of signal strength corresponding to the first uplink time slot. Thus the control unit 30 assigns any of a plurality of sub-channels contained in the first uplink time slot, as the communication channel. In this manner, the control unit 30 assigns the time slot where a plurality of sub-channels has been frequency-multiplexed, to the terminal apparatus 12.

Also, the control unit 30 transmits, via the modem unit 22, the RF unit 20 and the like, the information on the communication channel to the terminal apparatus as a channel assignment response. After the communication channel has been set, the base station apparatus 10 and the terminal apparatus 12 communicate with each other using the communication channel. In this manner, since the transmitting power is so adjusted that it falls within the range of the minimum signal strength at the time of the setting of the communication channel, the effect on the other terminal apparatuses 12 is reduced. Then the communication channel assigned to the targeted time slot may be shifted to another time slot by switch the channels.

It is to be noted that the channel assignment request and/or the channel assignment response are generally transmitted over the control channel. However, after a ranging operation has been terminated, the control unit 30 uses the ranging channel assigned to the terminal apparatus 12, for the communication of control signals such as a channel assignment request and a channel assignment response. That is, even after the ranging operation has been completed, the control unit 30 does not disuse the ranging channel and performs communications over a predetermine time period using said ranging channel. Note that said ranging channel may continue to be used even after the communication channel has been assigned.

This structure may be implemented hardwarewise by elements such as a CPU, memory and other LSIs of an arbitrary computer, and softwarewise by memory-loaded programs having communication functions or the like. Depicted herein are functional blocks implemented by cooperation of hardware and software. Therefore, it will be obvious to those skilled in the art that the functional blocks may be implemented by a variety of manners including hardware only, software only or a combination of both.

Figure 7:
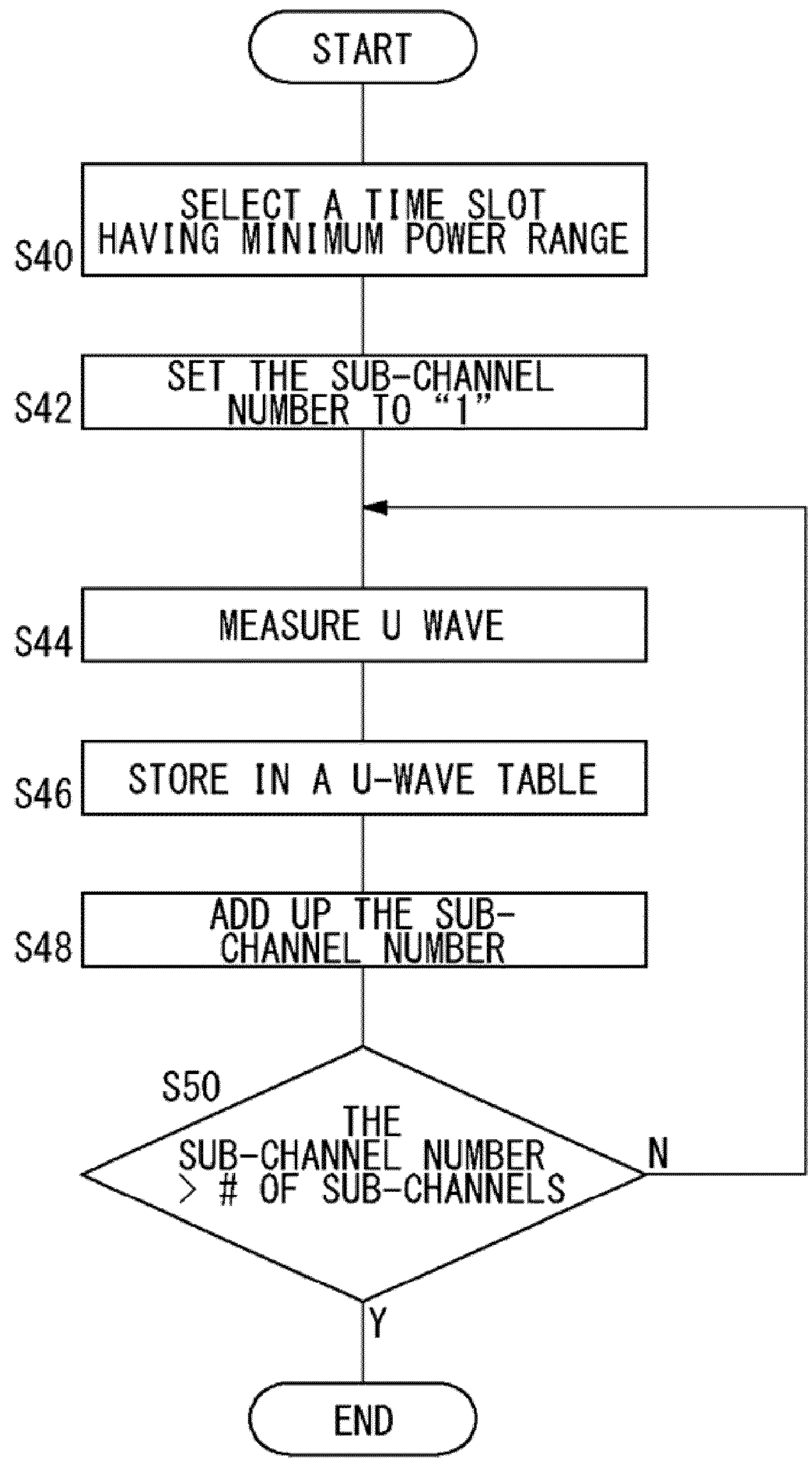
FIG. 7 is a flowchart showing a procedure for preparing a U-wave table by the base station apparatus of FIG. 5.

An operation of the communication system 100 structured as above will be described. FIG. 7 is a flowchart showing a procedure for preparing a U-wave table by the base station apparatus 10. FIG. 7 corresponds to Step 10 of FIG. 4. The control unit 30 selects a time slot having the minimum power range (S40), and sets the sub-channel number to "1" (S42). The measurement unit 28 measures the signal strength of U waves (S44), and the control unit 30 stores the measurement result in the U-wave table (S46). The control unit 30 adds up the sub-channel numbers (S48). If the sub-channel number does not become larger than the number of sub-channels (N of S50), return to Step 44. If, on the other hand, the sub-channel number becomes larger than the number of sub-channels (Y of S50), the processing will be terminated.

Figure 8:
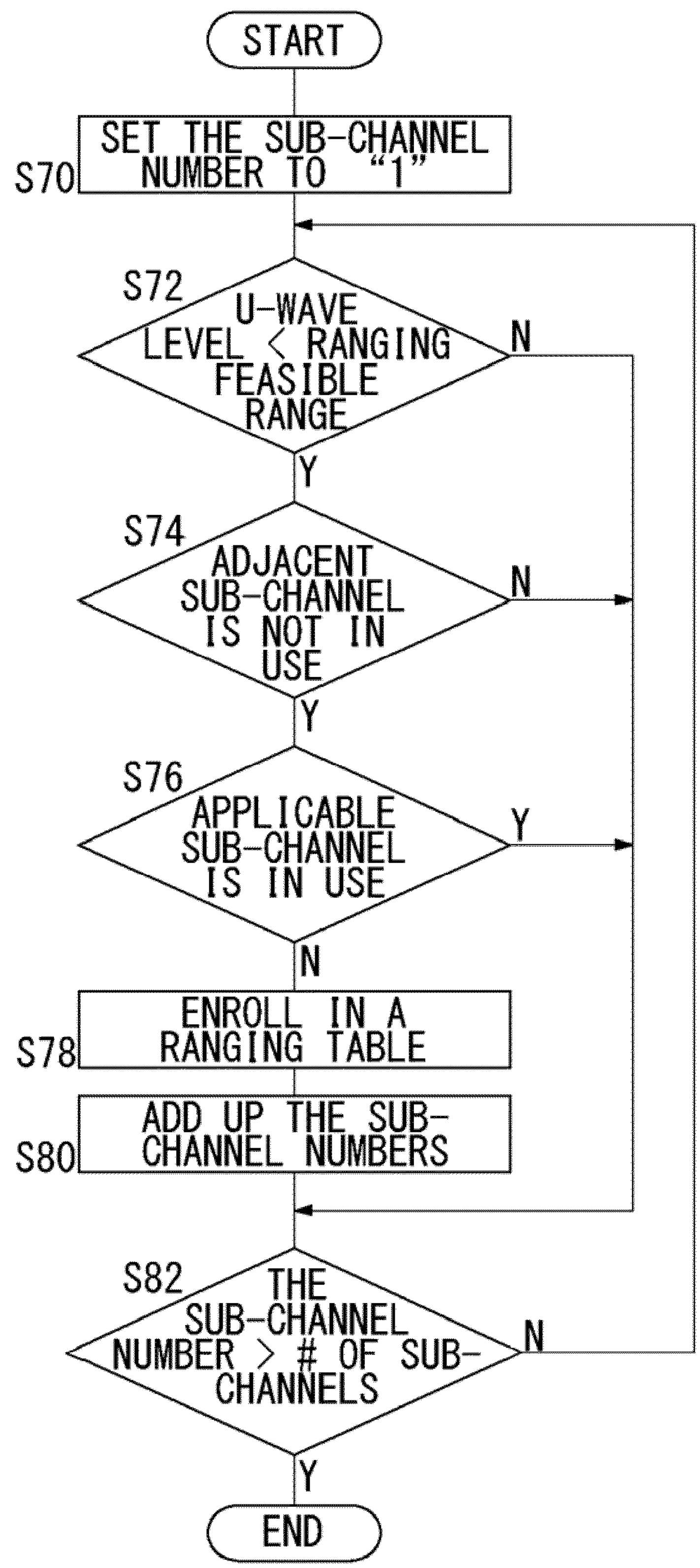
FIG. 8 is a flowchart showing a procedure for preparing a ranging table by the base station apparatus of FIG. 5.

FIG. 8 is a flowchart showing a procedure for preparing a ranging table by the base station apparatus 10. FIG. 8 illustrates a processing that follows the processing shown in FIG. 7, and FIG. 8 corresponds to Step 10 of FIG. 4. The control unit 30 sets the sub-channel number to "1" (S70). If the control unit 30 references the U-wave table and finds that the U-wave level is less than the ranging feasible range (Y of S72), the adjacent sub-channels are not in use (Y of S74) and the sub-channel in question is not used (N of S76), then the control unit 30 will enroll this sub-channel in the ranging table (S78). Here, the usage in Step 74 and Step 76 correspond to the usage over the communication channel, the ranging channel and the control channel. Also, the control unit 30 adds up the channel numbers (S80).

If, on the other hand, the U-wave level is not less than the ranging feasible range (N of S72), the adjacent sub-channels are not unused (N of S74) or the sub-channel in question is in use (Y of S76), then the control unit 30 will skip the processings of Step 78 and Step 80. If the sub-channel number does not become larger than the number of sub-channels (N of S82), return to Step 72. If, on the other hand, the sub-channel number becomes larger than the number of sub-channels (Y of S82), the processing will be terminated.

Figure 9:
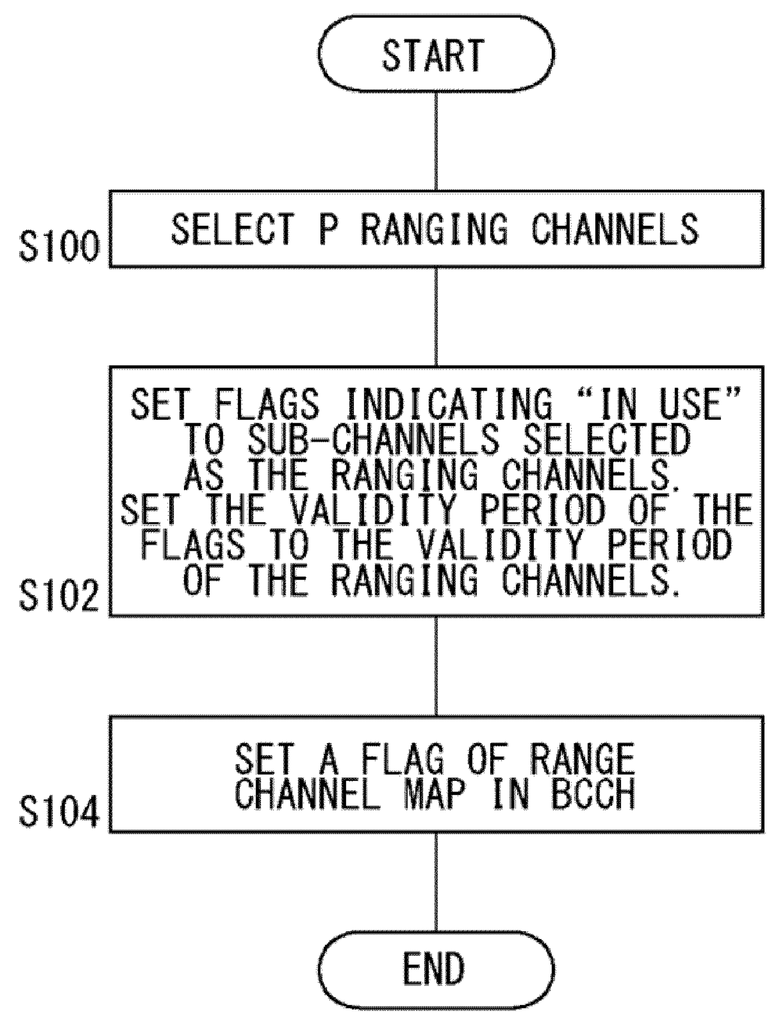
FIG. 9 is a flowchart showing a procedure for broadcasting a ranging channel map by the base station apparatus of FIG. 5.

FIG. 9 is a flowchart showing a procedure for broadcasting a ranging channel map by the base station apparatus 10. FIG. 9 illustrates a processing that follows the processing shown in FIG. 8, and FIG. 9 corresponds to Step 10 and Step 12 of FIG. 4. The control unit 30 selects P ranging channels from within the ranging table (S100). The control unit 30 may select a ranging channel in order starting from one with a smaller U-wave level or may select it in order starting from one with a smaller sub-channel number. Also, the control unit 30 may fix P or may vary it according to the congestion of the ranging channel and the traffic intensity thereof. The control unit 30 sets a flag, indicating "in use", for a sub-channel selected as the ranging channel (S102). In so doing, the validity period of the flag is set to the validity period of the ranging channel (S102). The control unit 30 sets a flag of the ranging channel map for BCCH, and the modem unit 22, the RF unit 20 and the like transmit the BCCH (S104).

FIG. 10 is a flowchart showing a procedure for performing a ranging operation by the terminal apparatus 12. FIG. 10 corresponds to the processings done by the terminal apparatus 12 among Step 14 to Step 26 of FIG. 4. The terminal apparatus 12 receives the ranging channel map for BCCH (S120). Also, the terminal apparatus 12 determines the number (M) of U-wave monitoring frames using random numbers (S122), and monitors the U waves for an M-frame period (S124). If the U-wave level is not smaller than the ranging feasible range (N of S126), return to Step 120. If the U-wave level is smaller than the ranging feasible range (Y of S126), the terminal apparatus 12 will transmit a ranging request (S128).

If a ranging response sent from the base station apparatus 10 is received (Y of S130), the terminal apparatus 12 will perform a ranging operation (S134). The terminal apparatus 12 transmits the channel assignment request (S136). When the channel assignment response is received (S138), the base station apparatus 10 and the terminal apparatus 12 communicate with each other (S140). If, on the other hand, the ranging response sent from the base station apparatus 10 is not received (N of S130) and it is possible to resume the request (Y of S132), return to Step 122. If it is not possible to resume the request (N of S132), return to Step 120.

Figure 11:
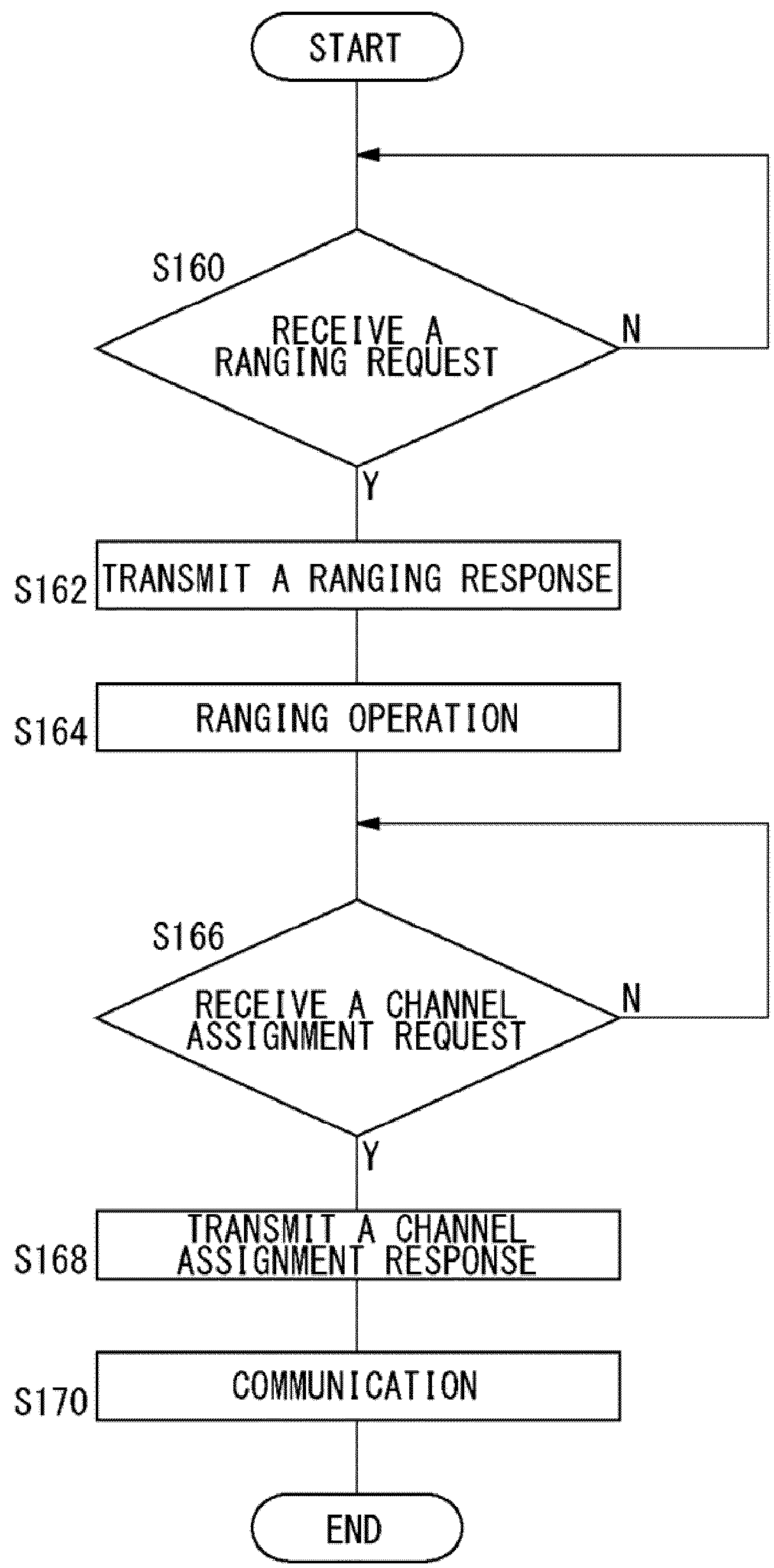
FIG. 11 is a flowchart showing a procedure for performing a ranging operation by the base station apparatus of FIG. 5.

FIG. 11 is a flowchart showing a procedure for performing a ranging operation by the base station apparatus 10. FIG. 11 corresponds to the processings done by the base station apparatus 10 among Step 16 to Step 26 of FIG. 4. If the ranging request is not received (N of S160), the RF unit 20, the modem unit 22 and the like are in stand-by state. If, on the other hand, the RF unit 20, the modem unit 22 and the like receive the ranging request (Y of S160), the modem unit 22, the RF unit 20 and the like will transmit the ranging response (S162). The RF unit 20, the modem unit 22 and the like perform a ranging operation (S164). If the channel assignment request is not received (N of S166), the RF unit 20, the modem unit 22 and the like are in stand-by state. If, on the other hand, the RF unit 20, the modem unit 22 and the like receive the channel assignment request (Y of S166), the modem unit 22, the RF unit 20 and the like will transmit the channel assignment response (S168). Then, the RF unit 20, the modem unit 22 and the like perform a communication (S170).

By employing the exemplary embodiment of the present invention, any of a plurality of sub-channels in a time slot associated with the range of low strengths is assigned as a ranging channel, so that the effect of interference can be reduced. Since the effect of interference is small, the accuracy of a ranging operation can be enhanced. Since a time slot associated with the range of low strengths is used as a ranging channel, the effect on the other terminal apparatuses can be reduced. Since the adjacent sub-channels are disused, assigning the terminal apparatus to the sub-channel in question over the ranging channel can be prevented. Also, since a transition is made from the ranging operation to a channel assignment operation over the ranging channel, the processing can transit smoothly to the next step.

Also, since the information on a ranging channel to be assigned is broadcast, the terminal apparatus is informed of the presence of the ranging channel. Also, a time slot to be assigned is selected according to the range of values of signal strength, the signals from a plurality of terminal apparatuses assigned to the same time slot are less interfered with one another. Since the interference is reduced, the deterioration of the receiving characteristics can be suppressed.

The present invention has been described based on the exemplary embodiment. The exemplary embodiment is intended to be illustrative only, and it is understood by those skilled in the art that various modifications to constituting elements and processes could be developed and that such modifications are also within the scope of the present invention.

INDUSTRIAL APPLICABILITY

The present invention enhances the accuracy of the ranging operation.

The invention claimed is:

1. A base station apparatus for assigning a time slot, where a plurality of sub-channels have been frequency multiplexed, to a terminal apparatus, the base station apparatus comprising:

a first assignment unit which assigns any of a plurality of sub-channels in the time slot corresponding to a range of low signal strengths, to the terminal apparatus as a ranging channel wherein a plurality of signal strength ranges correspond to a respective one of a plurality of time slots;

an execution unit which performs a ranging operation on the terminal apparatus over the ranging channel assigned by said first assignment unit; and a second assignment unit which assigns a sub-channel to the terminal apparatus that has performed the ranging operation in said execution unit, as a communication channel.

2. A base station apparatus according to claim 1, wherein said first assignment unit sets sub-channels at least adjacent to a sub-channel to which the ranging channel has been assigned, to a nonuse state.

3. A base station apparatus according to claim 1, wherein after the ranging operation has been terminated, said first assignment unit uses the ranging channel assigned to the terminal apparatus, for communication of control signal.

4. A base station apparatus according to claim 1, further comprising a broadcasting unit which broadcasts information on a ranging channel to be assigned by said first assignment unit.

5. A method for assigning a time slot, where a plurality of sub-channels have been frequency multiplexed, to a terminal apparatus, the method wherein a plurality of signal strength ranges correspond to a respective one of a plurality of time slots, any of a plurality of sub-channels in the time slot corresponding to a range of low signal strengths is assigned to the terminal apparatus as a ranging channel, and after a ranging operation in said ranging channel has been terminated, a sub-channel is assigned to the terminal apparatus as a communication channel.

6. A non-transitory computer readable medium storing computer executable instructions therein that, when executed by a computer, perform a method of, assigning a time slot, where a plurality of sub-channels have been frequency multiplexed, to a terminal apparatus, the method comprising:

assigning any of a plurality of sub-channels in the time slot corresponding to a range of low signal strengths, to the terminal apparatus as a ranging channel wherein a plurality of signal strength ranges correspond to a respective one of a plurality of time slots;

performing a ranging operation on the terminal apparatus over the assigned ranging channel; and assigning a sub-channel to the terminal apparatus that has performed the ranging operation, as a communication channel.

* * * * *